(12) United States Patent
Mao et al.

(10) Patent No.: US 7,943,112 B2
(45) Date of Patent: May 17, 2011

(54) METHODS OF MAKING LITHIUM VANADIUM OXIDE POWDERS AND USES OF THE POWDERS

(75) Inventors: Zhenhua Mao, Ponca City, OK (US); Mark W. Carel, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/786,130

(22) Filed: May 24, 2010

(65) Prior Publication Data

US 2010/0301267 A1  Dec. 2, 2010

Related U.S. Application Data

(60) Provisional application No. 61/181,319, filed on May 27, 2009.

(51) Int. Cl.
*C01G 31/00* (2006.01)
(52) U.S. Cl. .................. 423/594.8; 423/179.5; 423/274; 427/215; 29/623.1; 252/182.1; 429/231.2
(58) Field of Classification Search .............. 423/179.5, 423/274, 594.8; 427/215; 29/623.1; 252/182.1; 429/231.2
See application file for complete search history.

(56) References Cited

U.S. PATENT DOCUMENTS

| 5,326,545 | A  | 7/1994  | Koksbang et al. |
| 5,520,903 | A  | 5/1996  | Chang et al. |
| 5,576,120 | A  | 11/1996 | Saidi |
| 6,136,476 | A  | 10/2000 | Schutts et al. |
| 7,189,475 | B2 | 3/2007  | Sasaki et al. |
| 7,396,614 | B2 | 7/2008  | Jouanneau et al. |
| 2006/0039851 | A1 | 2/2006 | Harabasz et al. |
| 2008/0305256 | A1* | 12/2008 | Kimble et al. ............... 427/215 |
| 2010/0155656 | A1* | 6/2010 | Mao et al. .................. 252/182.1 |
| 2010/0159324 | A1* | 6/2010 | Irvin et al. .................... 429/220 |

FOREIGN PATENT DOCUMENTS

| EP | 1511101 A2 | 2/2005 |
| EP | 1801908 A1 | 6/2007 |

OTHER PUBLICATIONS

Pen, et al. "The phase transition in LiVO2 studied by temperature-dependent X-ray absorption spectroscopy" 1997, XP002608686, retrieved from the Internet: URL:http://dissertations.ub.rug.nl/FILES/faculties/science/1997/h.pen/c3.pdt [retrieved on Nov. 8, 2010 ] "Sample preparation", "experimental details".

Pen, et al. "Phase transition in LiV02 studied by near edge X-ray absorption spectroscopy" Physical Review B, vol. 55, No. 23, (Jun. 15, 1997), pp. 15500-15505, XP002608687.

Barker, et al. "Performance evaluation of the electroactive material, gamma-LiV2O5 made by Carbothermal Reduction Method" Journal of the Electrochemical Society, vol. 150, No. 9, 2003, pp. A1267-A1272, XP002608688, pp. A1267, col. 2, p. A1268, col. 2, pp. A1269, col. 2.

Zhang, et al. "Synthesis and electrochemistry of new layered (1-X) LiV02.xLi2Ti03 (0<x<0.6) electrode materials" Journal of Power Sources, Elsevier SA, CH LNKD-DOI:10.1016/J. JPOWSOUR. 2007.06.082, vol. 174, No. 2, (Nov. 20, 2007), pp. 1007-1011, XP022355208, ISN:0378-7753.

PCT/US2010/035969 International Search Report (Form PCT/ISA/210) dated Nov. 18, 2010).

\* cited by examiner

*Primary Examiner* — Steven Bos

(57) ABSTRACT

Methods relate to making lithium vanadium oxide powders. Applications for the lithium vanadium oxide powders include use as a negative electrode or anode material for lithium ion batteries. Liquid phase reactions and reduction in vanadium oxidation state of precursor material facilitate in the making of the lithium vanadium oxide powders. Particles forming the lithium vanadium oxide powders may further contain carbon to provide electrical conductivity.

14 Claims, 2 Drawing Sheets

METHODS OF MAKING LITHIUM VANADIUM OXIDE POWDERS AND USES OF THE POWDERS

CROSS-REFERENCE TO RELATED APPLICATIONS

None

STATEMENT REGARDING FEDERALLY SPONSORED RESEARCH OR DEVELOPMENT

None

FIELD OF THE INVENTION

Embodiments of the invention relate to lithium vanadium oxide materials.

BACKGROUND OF THE INVENTION

Requirements for a battery depend on intended applications for the battery. For example, batteries used in electric drive vehicles need long life cycle, low cost, high gravimetric densities and high volumetric densities sufficient to meet consumer demands. Materials used for construction of such batteries determine ability to meet the requirements desired.

Prior anode materials include carbonaceous particles such as graphite powder. However, density of the graphite powder limits capacity of resulting electrodes employing the graphite powder. Further, undesired reactions with organic electrolytes during discharge can result in fires or explosions.

Other proposed materials may exhibit properties that enable achieving better energy and power densities and safety than the carbonaceous material being replaced. However, various methods for synthesizing these proposed materials rely on techniques, such as solid-state reactions or hydrogen reduction processes, which create problems. In such methods, mixing and milling steps for combining precursors and achieving desired particle sizes for final products contribute to preparation costs associated with the methods and may still result in incomplete reactions and inconsistent particle sizes. Further, need for particular oxidation states of elements within the final products may limit ability in the methods to select the precursor material based on price.

Therefore, a need exists for improved methods of preparing particles, such as lithium vanadium oxide powder suitable for use as anode material for batteries.

SUMMARY OF THE INVENTION

In one embodiment, a process of preparing a lithium anode battery powder includes preparing a liquid mixture including a reducing agent, vanadium pentoxide ($V_2O_5$), and lithium ions from a lithium salt. The method further includes forming lithium vanadium oxide by subjecting the mixture to conditions that permit reduction of the vanadium pentoxide by the reducing agent for precipitation of lithium vanadium oxide particles. The particles have a formula defined as $Li_{1+x}VO_2$, where x is a number from 0 to 0.5.

According to one embodiment, a process of preparing a lithium anode battery powder includes preparing a liquid mixture including a reducing agent, vanadium pentoxide, and lithium ions from a lithium salt. In addition, the method includes forming lithium vanadium oxide by subjecting the mixture to conditions that permit the reducing agent to reduce the vanadium pentoxide, in absence of oxygen displacing anionic compounds, for precipitation of lithium vanadium oxide particles. Separating the particles from liquids of the mixture provides the lithium anode battery powder.

For one embodiment, a process of preparing a lithium anode battery powder includes preparing a liquid mixture including n-methyl-pyrrolidinone, vanadium pentoxide, and lithium ions from at least one of lithium carbonate and lithium hydroxide. Further, the method includes forming lithium vanadium oxide by heating the mixture such that the n-methyl-pyrrolidinone reduces vanadium oxidation state from 5+ to a lower oxidation state for precipitation of lithium vanadium oxide particles with a formula of $Li_{1+x}VO_2$, given x is a number from 0 to 0.5 and during the forming a molar ratio of lithium to vanadium within the mixture is from 1.5 to 1. The particles are incorporated into an anode of a battery.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Figure 1:
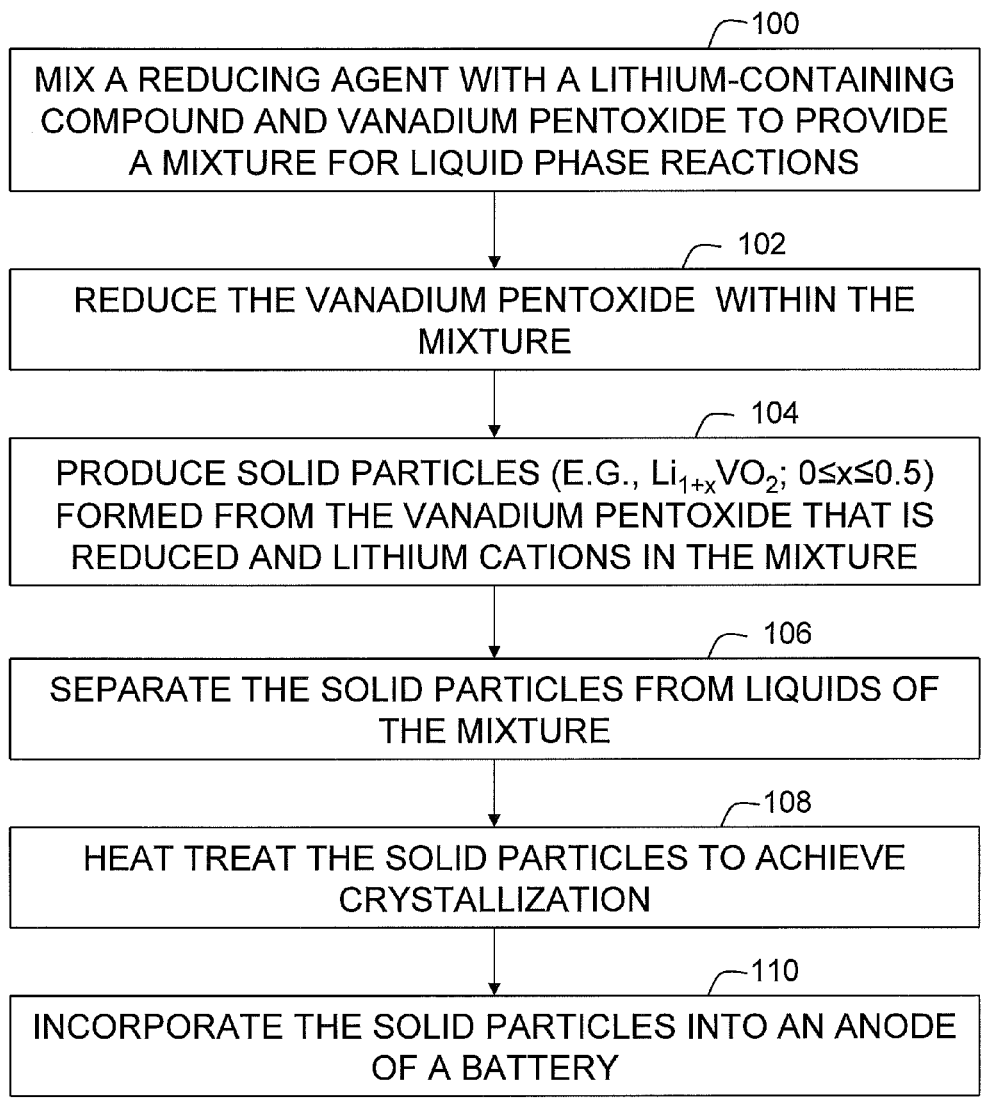
FIG. 1 is a flow chart illustrating a method of preparing lithium anode battery powder, in accordance with one embodiment.

Embodiments of the invention relate to methods of making lithium vanadium oxide powders. Applications for the lithium vanadium oxide powders include use as a negative electrode or anode material for lithium-ion batteries. Liquid phase reactions and reduction in vanadium oxidation state of precursor material facilitate in the making of the lithium vanadium oxide powders. Particles forming the lithium vanadium oxide powders may further contain carbon to provide electrical conductivity.

As used herein, the following terms have their usual meanings in the art and are intended to specifically include the following definitions:

Capacity (mAh/g): The amount of electrical charge that can be stored in and released from a given electrode material per unit weight within a certain defined electrode potential window.

Coulombic Efficiency (%): The ratio of the amount of electrical charge discharged from an electrode material to the amount of electrical charge that is used to charge the electrode to the state before discharge.

A "carbon-residue-forming material" (CRFM) is any material which, when thermally decomposed in an inert atmosphere to a carbonization temperature of 600° C. or an even greater temperature, forms a residue which is substantially carbon. "Substantially carbon," as used herein, indicates that the material is at least 95% carbon by weight.

"Carbonization" is a process that converts a carbon-containing compound to a material that is characterized as being "substantially carbon."

Precursors utilized in methods of preparing lithium anode battery powders include a source of vanadium and a source of lithium. Synthesis of a resulting product defined by particles of lithium vanadium oxide occurs via liquid phase reactions. A reducing agent as described further herein may be in a liquid state at ambient conditions and also serve as a solvent for the source of lithium.

In some embodiments, the precursors include vanadium pentoxide ($V_2O_5$) powder as the source of vanadium and a lithium salt such as lithium carbonate ($Li_2CO_3$) or lithium hydroxide (LiOH) as the source of lithium. Prior to combining the precursors, the vanadium pentoxide may be milled in a ball mill to a desired particulate size, such as an average particle size of less than 30 micrometers, less than 15 micrometers, less than 8 micrometers or less than 5 micrometers. Subjecting a mixture of the precursors to conditions that permit the reducing agent to reduce vanadium pentoxide in absence of oxygen displacing anionic compounds and in presence of lithium ions from the source of lithium dissolved in the mixture enables precipitation of the lithium vanadium oxide.

The methods do not require utilizing different compounds containing certain anions in order to create products incorporating the certain anions. The vanadium pentoxide that is reduced thus combines with the lithium ions without further reacting with anions such as phosphate ions. The methods thereby only rely on reduction of vanadium without dissolution of the vanadium pentoxide to provide elemental vanadium ions.

The solvent chosen dissolves at least some of the precursors, is stable at desired reaction temperatures, and does not dissolve the resulting product. Exemplary solvents include water and polar organic compounds such as NMP ($C_5H_9NO$, n-methyl-pyrrolidinone, n-methyl-2-pyrrolidinone, or 1-methyl-2-pyrrolidone), ethylene carbonate and propylene carbonate. Other examples of suitable solvents include alcohols, acids, nitriles, amines, amides, quinoline, pyrrolidinones, and combinations of such solvents. If the solvent is also used as the reducing agent, the solvent is reactive with the precursor for the source of vanadium. For some embodiments, a solvent-reducing agent thus includes liquid organic compounds, such as alcohols, hydrocarbons, and carbohydrates.

After the precursors and reducing agent are mixed resulting in a liquid mixture, the mixture is heated in an inert atmosphere such as nitrogen, helium, argon, carbon monoxide, and/or carbon dioxide gas while the mixture is agitated. With pressure below 3500 kilopascal, the temperature is controlled to be between 50° C. and 400° C. or between 200° C. and 300° C. Heating drives the precursors and reducing agent to react and form the lithium vanadium oxide, which may have a desired stoichiometric composition.

As the precursors are mixed and heated, the reducing agent causes the reduction of the vanadium pentoxide from a plus-five oxidation state ($V^{5+}$) to a plus-three or lower oxidation state ($V^{3+}$). While the vanadium pentoxide does not dissolve to form a true solution with the source of lithium that is dissolved, the vanadium pentoxide loses oxygen atoms to the reducing agent and combines with the lithium ions during the heating. Solid particles of the lithium vanadium oxide precipitate out of the solution as a result of the heating and subsequent reacting. In some embodiments, the lithium vanadium oxide formed has a formula defined as $Li_{1+x}VO_2$, where x is a number from 0 to 0.5 or about 0.2. During forming of the particles of the lithium vanadium oxide, molar ratio of lithium to vanadium within the mixture may be controlled to be from 1.5 to 1.

In some embodiments, the precursors further include a CRFM. The CRFM provides electrical conductivity for the solid particles and may be introduced for incorporation with the solid particles during formation of the solid particles or subsequent to formation of the lithium vanadium oxide, such as when applied in coating processes at any time after precipitation of the lithium vanadium oxide. Carbon-containing lithium vanadium oxide refers to the particles described herein for the lithium vanadium oxide that incorporates the CRFM.

Without limitation, examples of the CRFM include petroleum pitches and chemical process pitches, coal tar pitches, lignin from pulp industry, and phenolic resins or combinations thereof. The CRFM may comprise a combination of organic compounds such as acrylonitrile and polyacrylonitriles, acrylic compounds, vinyl compounds, cellulose compounds, and carbohydrate materials such as sugars. For some embodiments, the CRFM includes reaction products of the NMP. With the heating of the mixture, the CRFM is thus also formed when the reducing agent is oxidized and becomes less soluble in the mixture and non-volatile when heated, consequently precipitating on and/or in the solid particles.

Presence of the solvent prevents the solid particles from growing and agglomerating. Therefore, controlling concentration of the solid particles in the mixture achieves desired particle size and controls or limits agglomeration of the solid particles. For some embodiments, total solid content in the mixture may be between 5% and 70% by weight. Given that theoretical productivity may rise with increase in the solid content, the solid content may be between 10% and 70% of the solution-suspension by weight, or above 20% by weight.

Separating the solid particles from liquids of the mixture provides a loose dry powder. Any conventional method for solid-liquid separation, such as centrifugal separation or filtration, can be used to separate the lithium vanadium oxide from the liquids of the mixture. Depending on precursor quality and amount of impurities, separation can be achieved by evaporating the liquids. In some embodiments, the liquids that provide the solvent may be recycled back for combining with new precursors following a process that eliminates water and byproducts.

The solid-liquid separation prevents or at least limits amount of contaminants, impurities or non-desired materials present with the lithium vanadium oxide. In particular, the non-desired materials remain dissolved in the liquids that are separated from the solid particles of the lithium vanadium oxide. In a solid state reaction, contaminants, impurities or non-desired materials including those contained in the precursors or formed as byproducts of the reactions are more likely to be carried into final products.

The carbon-containing lithium vanadium oxide may not have degree of crystallinity desired following the solid-liquid separation. Heat treating increases temperature of the carbon-containing lithium vanadium oxide powder to above 300° C. in an inert atmosphere. For some embodiments, the temperature of the heat treating is above 900° C., above 1000° C., or between 950° C. and 1250° C. Such heating provides conditions to form desired crystalline structures and carbonizes the CRFM if present. Further, achieving x being from 0 to 0.5 in the formula $Li_{1+x}VO_2$ may occur after the heating, which with carbon presence may enable reduction of the lithium vanadium oxide. When x is 0 or less or greater than 0.5, the crystalline structures may not form with the heating of the lithium vanadium oxide.

Introducing graphite or carbon black into the particles offers one approach for creating sufficient electrical conductivity to enable the powder to perform in a battery. For some embodiments, a carbon coating as described in U.S. Pat. No. 7,323,120 may be applied to the powder to provide the electrical conductivity. Essentially, this additional coating process comprises applying the coating on the powder while the powder is suspended in a solution of CRFM using a selective precipitation method. The lithium vanadium oxide with the CRFM coating is then heated (e.g., between 500° C. and 1000° C., between 600° C. and 900° C., between 700° C. and 900° C.) to convert the CRFM to carbon and to bond the carbon coating firmly to the particles of the lithium vanadium oxide. The coating results in amount of carbon on and/or in the carbon-containing lithium vanadium oxide being above 0.5 wt % and up to about 10 wt %, between 0.5 wt % to about 5 wt %, or between 1 wt % and 3 wt %. Even without the coating, techniques as described herein can attain the carbon content between 0.5 wt % and 10 wt %, between 0.5 wt % and 5 wt %, and between 1 wt % and 3 wt %.

FIG. 1 shows a process flow diagram that sets forth a method described herein of preparing a lithium anode battery powder, for one embodiment. A liquid mixture that is prepared in mixing step 100 includes a reducing agent, such as NMP, lithium ions from a lithium salt, and vanadium pentoxide. Subjecting the mixture to conditions for vanadium pentoxide reduction permits in vanadium reduction step 102 the reducing agent to reduce vanadium oxidation state from 5+ to 3+ or less within the mixture. Precipitation step 104 forms lithium vanadium oxide by subjecting the mixture to conditions that permit precipitation of lithium vanadium oxide particles formed from combining the vanadium pentoxide that is reduced and the lithium ions. In collection step 106, separating solids from liquids within the mixture isolates the particles. Heating the particles achieves crystallization of the particles, in treatment step 108. Further, battery assembly step 110 includes incorporating the particles into an anode of a battery.

Figure 2:
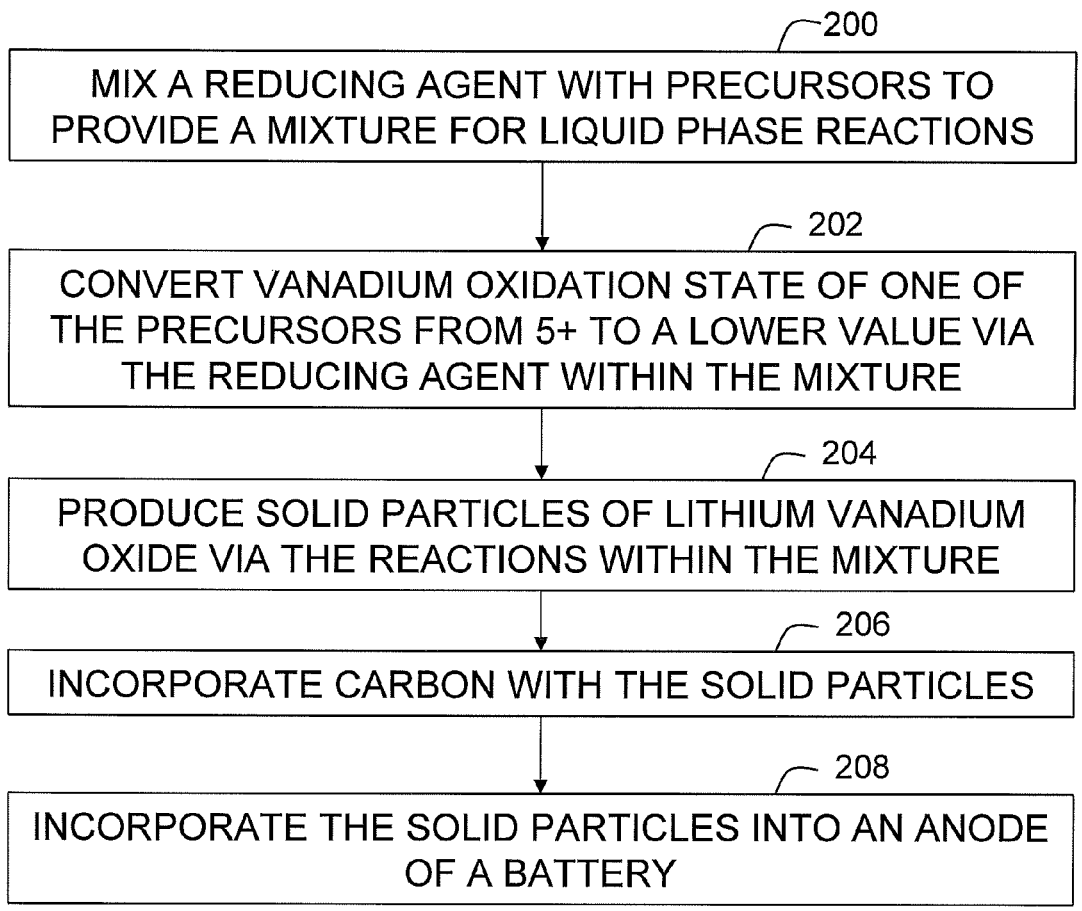
FIG. 2 is a flow chart illustrating a method of preparing lithium anode battery powder that includes incorporation of carbon with particles of the powder, in accordance with one embodiment.

FIG. 2 illustrates a process flow diagram representing a method of preparing lithium anode battery powder that includes carbon incorporated with particles of the powder. A liquid mixture that is prepared in mixing step 200 includes a reducing agent, lithium ions, and vanadium pentoxide. In vanadium reduction step 202, conditions that the mixture is subjected to permit the reducing agent to reduce vanadium oxidation state from 5+ to a lower value within the mixture. Precipitation step 204 thereby forms lithium vanadium oxide while the mixture is subjected to conditions that permit precipitation of lithium vanadium oxide particles.

Various approaches enable incorporating carbon with the particles, in carbon combining step 206. In some embodiments, the carbon combining step 206 may include carbon-coating applications for lithium vanadium oxide powders made by other methods, such as when powders are made with $V_2O_3$ utilized as precursor for vanadium. Further, battery assembly step 208 includes incorporating the particles into an anode of a battery. Timing of the carbon combining step 206 depends on the approach used to incorporate the carbon with the particles and may thereby occur anytime prior to the battery assembly step 208.

For example, the carbon combining step 206 may occur with the precipitation step 204 if a CRFM is added to the mixture in the mixing step 200. Further, the CRFM may be added to the mixture following the precipitation step 204 by adding a solution of pitch, for example, to the mixture such that, by subjecting the mixture to conditions that permit precipitation of the pitch, the pitch coats the particles after being formed. In some embodiments, such precipitation of the CRFM occurs by utilizing suspensions prepared with the particles after separating the particles from the mixture but before heating of the particles to crystallize the particles and/or carbonize the CRFM. For some embodiments, the particles have already been heat treated for crystallization prior to being coated by techniques described herein for precipitation of the CRFM.

In addition, the CRFM may be contributed in the carbon combining step 206 by NMP oxidation-reduction reaction with five valence vanadium, as described herein. Oxidation of the NMP produces water and carbon-yielding materials that remain in solution after the precipitation step 204 and do not evaporate if the lithium vanadium oxide particles are separated from liquids in the mixture by evaporation. These carbon-yielding materials thus coat the lithium vanadium oxide since separation is accomplished by evaporation so as to keep a residual layer of the carbon-yielding compounds with the lithium vanadium oxide particles. In some embodiments, regulating an amount of liquid separated from the mixture by filtration prior to evaporation helps control level of coating on the particles.

EXAMPLES

Example 1

A mixture was prepared with 31.3 grams of $V_2O_5$ powder (99.2%, Alfa Chemical), 18.1 grams of hydrated lithium hydroxide ($LiOH \cdot H_2O$, 98%) and 90 grams of n-methyl-pyrrolidinone (NMP). The mixture was shaken in a plastic bottle for about 10 minutes. Subsequently, the mixture was transferred into a stainless steel pressure vessel and heated at 250° C. for 3 hours while the mixture was continuously agitated. Then, the vessel was continuously purged with nitrogen gas until liquid in the mixture was completely evaporated. Heat was removed and the vessel was cooled to room temperature. A resulting dried powder weighed 34.6 grams.

The powder was transferred into a furnace, and subsequently heated at 1150° C. for 3 hours under a nitrogen gas atmosphere. The furnace was then cooled to room temperature. The powder was retrieved from the furnace. Total weight of the powder was 30.6 grams. The powder was then evaluated for electrochemical properties as the active anode material in lithium ion cells, as described further herein.

Example 2

To evaluate potential for carbon coatings, 14.7 grams of the powder made in Example 1 was coated with about 5% of pitch. In particular, the powder was first dispersed in 100 ml of xylene to form a dispersion heated to 140° C. In parallel, 8 grams of a petroleum pitch was dissolved in an equal amount of xylene to form a pitch solution that was heated to 90° C. The pitch solution was poured into the dispersion and continuously heated at 140° C. for 10 minutes. The heat was removed. The solution was cooled to room temperature. Resulting solid particles were separated out by filtration. Once separated, the particles provided a powder that weighed 15.52 grams, yielding a pitch coating level of 5.3%.

The powder was transferred into a furnace and heated in nitrogen gas under the following sequence: 1° C./minute to 250° C., held for 4 hours, 1° C./minute to 300° C., held for 8 hours, 5° C./minute to 1100° C., held for 1 hour, and then 5° C./minute to room temperature. The powder that resulted weighed 15.2 grams. The powder was then analyzed for carbon content. A mixture was prepared by dissolving 2 gram of the powder in 50 ml of 15 wt % acidic aqueous solution (7 wt % HCl, 5 wt % $HNO_3$, and 3% $H_2SO_4$) at 60° C. Acid insoluble residual solid was separated by filtration, washed thoroughly with deionized water, and dried at 100° C. under vacuum for over 2 hours. Since this solid contained mainly elemental carbon, ash content of the solid was obtained by burning in air at 850° C. The powder made in Example 2 was thereby determined to contain 5.0% carbon.

Electrochemical evaluation—The powders made in the Examples 1 and 2 were evaluated as the anode material for lithium ion batteries. The powders were fabricated into electrodes and then tested in coin cells.

Electrode Preparation—The powder (made in Example 1 or Example 2) was mixed with a graphite powder, acetylene carbon black powder, and polyvinylidene fluoride (PVDF) solution (N-methylpyrrolidinone as the solvent) to make a slurry. The slurry was cast on 10 micron thick copper foil. A slurry coated film that resulted was dried on a hot plate. The film that was made contained 2% carbon black, 46.5% graphite, 5% PVDF, and 46.5% of a respective one of the powders of lithium vanadium oxide. The film was trimmed into 5 cm strips and pressed through a hydraulic rolling press. Thickness or mass loading of the film was controlled to be about 6 mg/cm$^2$.

Electrochemical tests—Disks of 1.41 cm in diameter were punched out from the films prepared as described and were used as the positive electrode in standard coin cells (size CR2025) with lithium metal as the negative electrode. The separator used in the coin cells was a glass mat (Watman® Glass microfibre filter, GF/B), and the electrolyte was 1 M LiPF$_6$ in a mixture of solvents (40% ethylene carbonate, 30% methyl carbonate, and 30% diethyl carbonate). A test scheme was as follows. The cells were charged under a constant current of 0.5 mA (~50 mA/g) until the cell voltage reached 0.0 volts, and charged further at 0.0 volts for one hour or until the current dropped to below 0.03 mA. The cells were then discharged at constant current of 0.5 mA until the cell voltage reached 2.0 volts. Charge/discharge cycles were repeated to determine material stability during cycling. Capacity of the powders was indicated by calculations based on passed electrical charge during discharging, while coulombic efficiency was calculated based on ratio of discharge capacity to capacity on charging. All the tests were conducted using an electrochemical test station (Arbin Model BT-2043). All experiments were conducted at room temperature (~22° C.).

In contrast to cathode materials that result in voltage increases during charging, the cell voltage for the cells with the powder of Example 1 decreased with charging. The charge/discharge cycles thereby demonstrated suitability for the powder as the anode material. Further, the powder of lithium vanadium oxide thus provided electrochemical characteristics distinct from such cathode materials as lithium vanadium phosphate.

Specific capacity of the electrodes made with powders of Example 1 was about 250 mAh/g on a first cycle, but increased to about 300 mAh/g by the tenth cycle. The specific capacity was calculated based on total weight of both the lithium vanadium oxide and the graphite powder. Given that the specific capacity of the graphite powder was 305 mAh/g, a portion of the specific capacity contributed from the lithium vanadium oxide of Example 1 was determined based on the graphite powder accounting for 46% of the total weight. The specific capacity of the lithium vanadium oxide of Example 1 was therefore calculated on the first cycle to be 204 mAh/g and 296 mAh/g on the tenth cycle. Even though the specific capacity for the powder of Example 1 is about the same as if utilizing the graphite powder alone, density of the electrodes made with the powders of Example 1 was measured to be 2.2 g/cc compared to about 1.4 g/cc for graphite electrodes without lithium vanadium oxide. Thus, volumetric specific capacity of the electrodes made with the powders of Example 1 is higher than that of the graphite electrodes by 57%.

Overall specific capacity of the electrodes made with powders of Example 2 was 340 mAh/g after ten cycles. Calculated specific capacity of the powders of Example 2 was 370 mAh/g. Thus, the powders of Example 2 with the carbon coating provided better specific capacity performance relative to the powders of Example 1 that lacked the carbon coating.

In view of the foregoing, lithium vanadium oxides powders synthesized as described herein result in desirable electrochemical properties when used as anode materials for Li-ion batteries. Simplicity of preparing the lithium vanadium oxides powders enables economical production of the powders. Further, use of inexpensive vanadium precursors further facilitates making production of the powders economical.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising the steps of:
preparing a liquid mixture comprising a reducing agent, vanadium pentoxide, and lithium ions from a lithium salt; and
forming lithium vanadium oxide by subjecting the mixture to conditions that permit reduction of the vanadium pentoxide by the reducing agent for precipitation of lithium vanadium oxide particles, wherein the particles have a formula defined as $Li_{1+x}VO_2$, where x is a number from 0 to 0.5.

2. The method according to claim 1, wherein forming the particles includes heating the mixture that has a molar ratio of lithium to vanadium within the mixture from 1.5 to 1 while forming the particles.

3. The method according to claim 1, wherein the lithium salt comprises at least one of lithium carbonate and lithium hydroxide.

4. The method according to claim 1, wherein the reducing agent is n-methyl-pyrrolidinone.

5. The method according to claim 1, wherein the lithium salt comprises at least one of lithium carbonate and lithium hydroxide and the reducing agent is n-methyl-pyrrolidinone.

6. The method according to claim 1, further comprising crystallizing the particles by heating the particles at a temperature above 1000° C.

7. The method according to claim 1, wherein x is 0.2.

8. The method according to claim 1, wherein the reducing agent is an organic compound.

9. The method according to claim 1, wherein the mixture further comprises a carbon-residue-forming material.

10. The method according to claim 1, further comprising:
coating the particles with a carbon-residue-forming material; and
heating in an inert environment the particles that are coated, wherein the heating is at a temperature sufficient to carbonize the carbon-residue-forming material.

11. The method according to claim 1, further comprising:
oxidizing the reducing agent, wherein the reducing agent is n-methyl-pyrrolidinone and remains on the particles after evaporation of liquids from the mixture to form a coating that is between 1 and 10 weight percent of the particles; and
heating the coating in an inert environment at a temperature sufficient to carbonize the coating on the particles.

12. A method comprising the steps of:
preparing a liquid mixture comprising n-methyl-pyrrolidinone, vanadium pentoxide, and lithium ions from at least one of lithium carbonate and lithium hydroxide;
forming lithium vanadium oxide by heating the mixture such that the n-methyl-pyrrolidinone reduces vanadium oxidation state from 5+ to a lower oxidation state for precipitation of lithium vanadium oxide particles, wherein during the heating a molar ratio of lithium to vanadium within the mixture is from 1.5 to 1 and the particles have a formula of $Li_{1+x}VO_2$, where x is a number from 0 to 0.5; and
incorporating the particles into an anode of a battery.

13. The method according to claim 12, wherein the mixture further comprises at least one of a material selected from the group consisting of petroleum pitches and chemical process pitches, coal tar pitches, lignin from pulp industry, phenolic resins and combinations thereof.

14. The method according to claim 12, further comprising heating the particles removed from the mixture to carbonize a material that is part of the particles, wherein the material is selected from the group consisting of petroleum pitches and chemical process pitches, coal tar pitches, lignin from pulp industry, phenolic resins and combinations thereof.

* * * * *